United States Patent [19]
Krüger

[11] Patent Number: 5,887,694
[45] Date of Patent: Mar. 30, 1999

[54] HAND-BRAKE LEVER WITH AN INTEGRATED GEAR SELECTOR

[75] Inventor: Helmut Krüger, Wolfsburg, Germany

[73] Assignee: Volkswagen AG, Wolfsburg, Germany

[21] Appl. No.: 906,050

[22] Filed: Aug. 5, 1997

[30] Foreign Application Priority Data

Aug. 9, 1996 [DE] Germany .................. 196 32 245.5

[51] Int. Cl.[6] .................................................. B60K 41/26
[52] U.S. Cl. .................. 192/220; 192/219; 192/219.4; 74/473.3; 340/456; 116/28.1
[58] Field of Search .................. 192/4 A, 4 R, 192/4 C; 74/473.3, 537, 538; 116/28.1, DIG. 20; 340/456

[56] References Cited

U.S. PATENT DOCUMENTS 3,901,097  8/1975  Williams et al. .................. 74/473.3
3,979,967  9/1976  Dunlap .................. 74/473.3
4,104,982  8/1978  Hegemann .................. 74/473.3 X

FOREIGN PATENT DOCUMENTS 0209431  1/1987  European Pat. Off. .
0466534  1/1992  European Pat. Off. .
0706922  4/1996  European Pat. Off. .
 729325  12/1912  Germany .

Primary Examiner—Rodney H. Bonck
Assistant Examiner—Ankur Parekh
Attorney, Agent, or Firm—Baker & Botts, L.L.P.

[57] ABSTRACT

A hand brake and an integrated gear selector including a lever which is pivotably mounted at one end and a handle mounted for rotation about its axis on the lever. The pivoting motion of the lever actuates the hand brake and rotation of the handle selects a transmission gear or driving condition of the vehicle.

6 Claims, 3 Drawing Sheets

HAND-BRAKE LEVER WITH AN INTEGRATED GEAR SELECTOR

BACKGROUND OF INVENTION

This invention relates to actuating devices for hand brakes and gear selector mechanisms for motor vehicle transmissions, in which a lever having a handle is mounted so as to be pivotable and the pivoting function actuates the hand brake.

Because of structural considerations, customary arrangements providing separate operating devices for a hand brake and a gear selector lever do not permit an ergonomically correct side-by-side arrangement for the actuating components for the hand brake and gear selector. These components therefore have to be placed one behind the other. This means that, when the driver's seat of the motor vehicle has been moved forward appropriately, short operators (about 5% of all operators) have difficulty reaching the hand brake, not to mention being able to operate it with sufficient strength. Tall operators, on the other hand, such as for example the so-called "90% man", can only reach the fifth gear by bending forward when the seat has been moved back to accommodate them.

European Patent No. 0 209 431 discloses a combined transmission and hand-brake control which has a common hand-brake lever for the selection and shifting of the transmission gears and for engaging the hand brake. A manual transmission is actuated by pivoting the lever forward, backward and sideward. A safety arrangement which can be controlled by an additional handle permits a pivoting movement of the lever for actuating the hand brake.

A selector lever for actuating a manual transmission which is provided additionally with a tension device is disclosed in German Patent No. 729 325. The tension device is located in the selector lever and actuates the hand brake through a cable pull. For this purpose, the tension device is arranged so that it can be pulled axially out of the selector lever, and the cable pull is flexible in a region between the selector lever and the connection to the vehicle body.

These arrangements have the disadvantage that they are complex in design and they require separate room for movement of the actuating lever to operate as a hand brake and as a transmission control. There is, therefore, no freedom of choice of the installation location. Furthermore, a safeguard is required to avoid inadvertent actuation of the hand brake when shifting the gears of the transmission.

SUMMARY OF THE INVENTION

Accordingly, it is an object of the present invention to provide a hand brake lever with an integrated gear selector which overcomes the disadvantages of the prior art.

Another object of the invention is to provide a hand brake lever with an integrated gear selector which is of simple construction and requires little pivoting space for the functions of hand brake and gear selection.

These and other objects of the invention are attained by providing a hand brake lever with a handle which is rotatable about its longitudinal axis, the transmission gear or driving condition being selectable by rotational movement of the handle. This lever can be positioned in an ergonomically favorable manner, for example between the conventional positions of the gear selector lever and the hand brake. Furthermore, only the actuation of the lever as a hand brake requires room for pivoting the lever. The installation location is thus freely selectable over a wide range.

By virtue of the fact that the longitudinal axes of the lever and handle are parallel, a space-saving arrangement is thus achieved in a particularly advantageous manner.

A particularly simple arrangement with an uncomplicated assembly is achieved since the lever is a handbrake lever with an engagement device, a handle and an actuating knob for the engagement device, the handle being configured to be rotatable about its longitudinal axis for the selection of the transmission gear or the driving condition.

An integrated lock against driving the vehicle, for example in the "Park" position of the rotatable handle, advantageously increases the safety of operation of the arrangement.

In a particularly ergonomic embodiment, the handle is positioned at an angle of from zero to about 45 degrees to a longitudinal axis of the motor vehicle or to the seat plane of an operator when the hand brake is disengaged.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
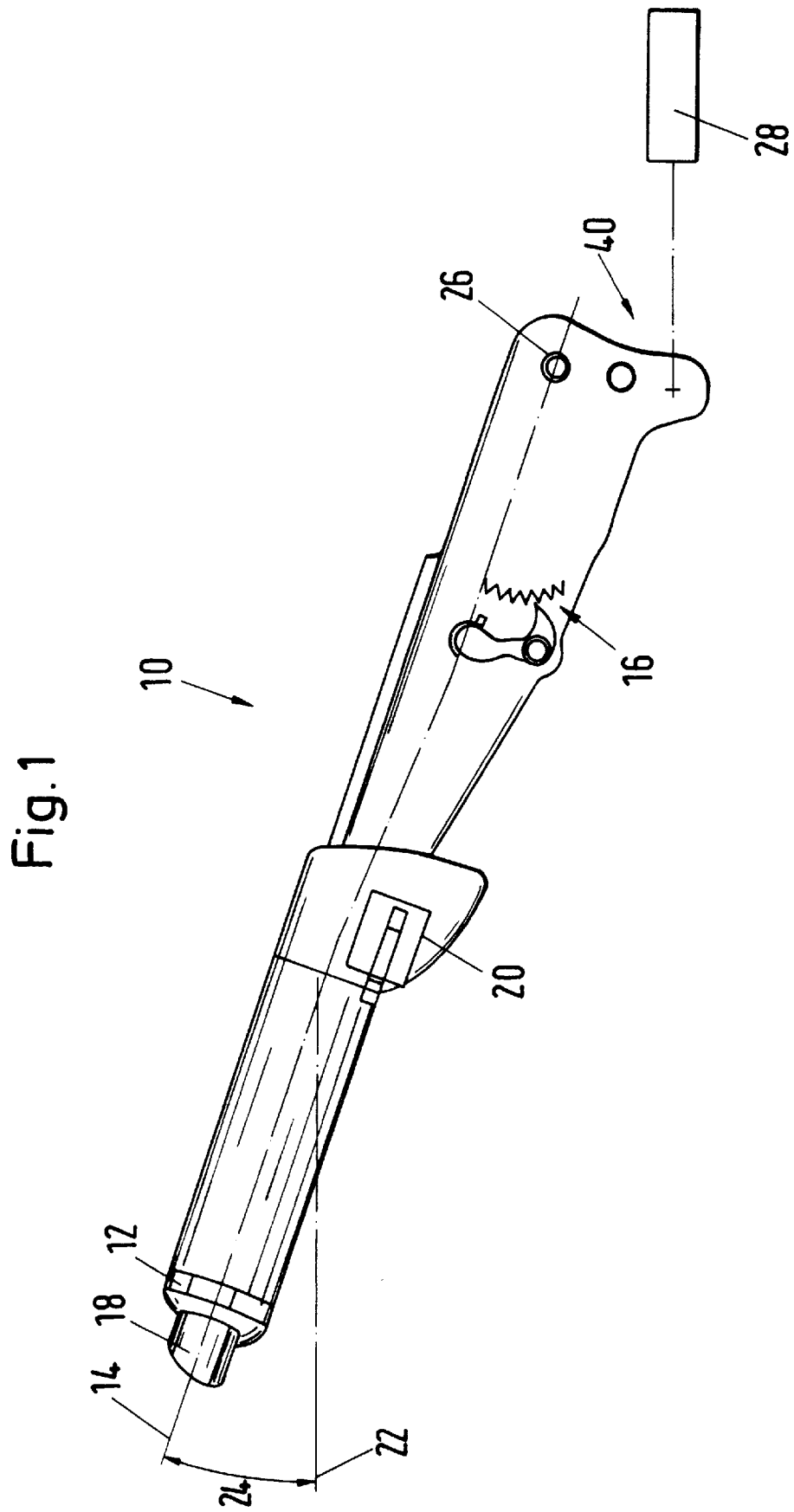
FIG. 1 side view illustrating a preferred embodiment of a hand brake lever with an integrated gear selector according to the invention.

In the preferred embodiment of the invention shown in FIG. 1, a lever 10 is mounted so as to be pivotable about a pivot point 26. At one end 40 adjacent to the pivot point 26, the lever is connected to a cable pull device 28 for a hand brake so that pivoting of the lever 10 actuates the cable pull device 28 and thus the hand brake. Of course, instead of the cable pull 40, an actuating linkage or the like is also possible.

When the lever 10 is pivoted, an engagement mechanism 16 is latched in such a way that the lever automatically remains or is retained in the pivoted state. The engagement mechanism is released by pressing an actuating knob 18 so that the lever 10 can be pivoted back to its starting position so that the hand brake is then disengaged.

To operate the transmission of the motor vehicle, the lever 10 has a handle 12 which is rotatable about a longitudinal axis 14 of the handle. By turning the handle 12, the transmission is operated, i.e. a gear or a driving position is selected. The transmission may be an automatic transmission or a power-assisted manual transmission.

Since the handle 12 rotates about its own axis and, in the present embodiment, the longitudinal axis of the handle 12 coincides with the longitudinal axis of the lever 10, no additional room is required for actuating the gear selector for the transmission. Furthermore the lever 10 with the handle 12 can be arranged in an ergonomically optimum location.

This is also achieved, inter alia, by providing an angle 24 of from zero to about 45 degrees between the handle 12 and a longitudinal axis 22 of the motor vehicle when the lever 10 is positioned with the hand brake disengaged. Both the gear selector and the hand brake can thus be actuated in an ergonomically optimum manner.

Figure 2:
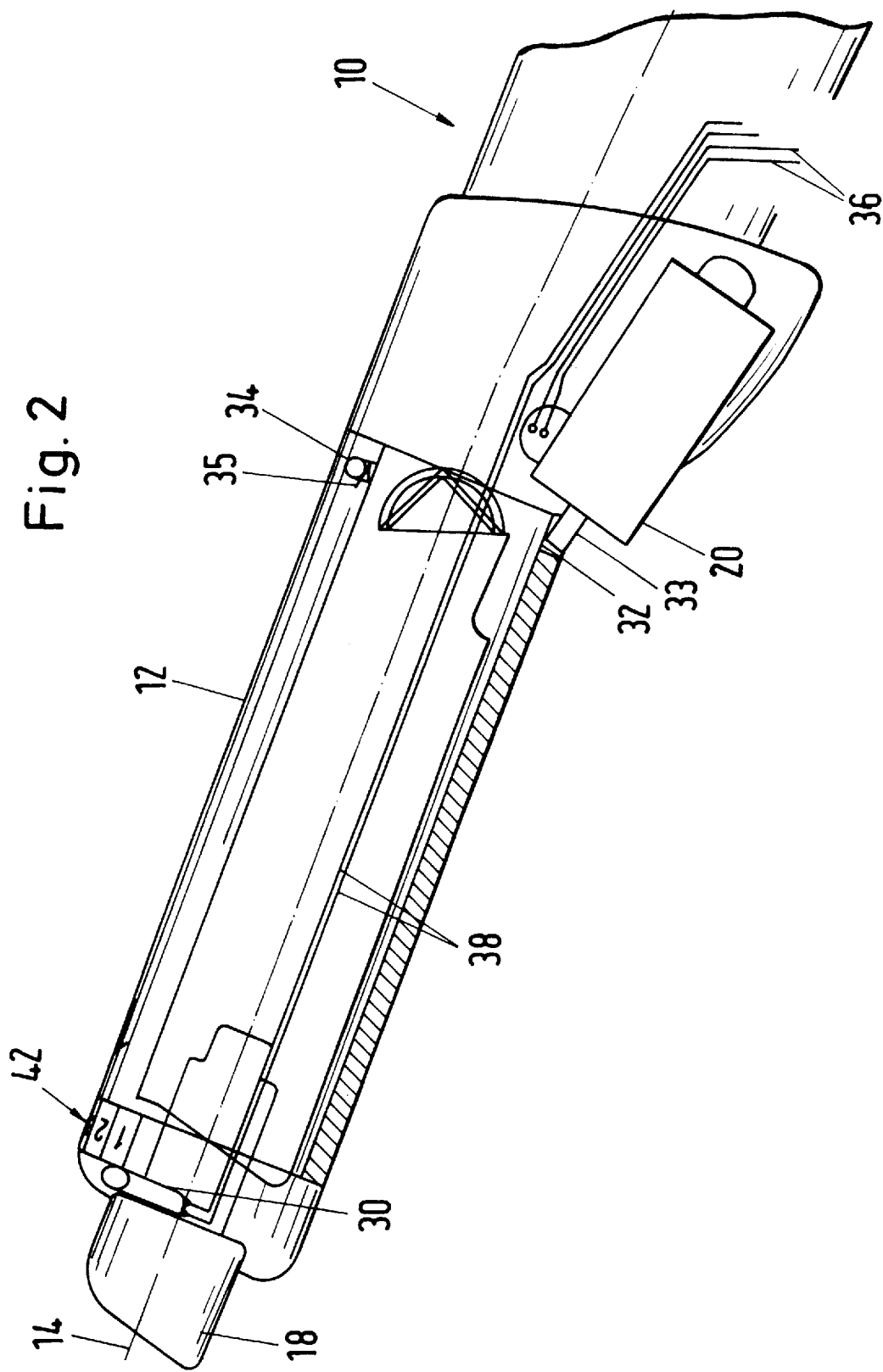
FIG. 2 is an enlarged side view of the embodiment shown in FIG. 1.

FIG. 2 is an enlarged view of a portion of the lever 10. This view shows that a recess 32 for a locking pin 33 of an electrically actuable lock 20 to prevent vehicle motion is also integrated in the handle 12. This lock prevents unintentional driving of the vehicle. When the vehicle is started, the lock 20 is disengaged by applying pressure to the brake pedal. Gear selection is possible only after this has been done.

Furthermore, the lever has an internal light 30 for a gear selection display 42, which is preferably located at the end of the lever 10 containing the actuating knob 18. Electric wires 36 and 38 lead from the lighting device 30 and the lock against driving away 20 to an electrical connector (not illustrated). Moreover, the selector handle 12 has switching contacts and connecting wires (not illustrated) by which the selection of a gear or driving position for the transmission is indicated to a conventional transmission control device.

A gear selector detent 34 releasably holds the rotatable handle 12 in a selected position and preferably consists of a spring-loaded ball which engages recesses in an internal engagement groove 35 in the handle 12.

Figure 3:
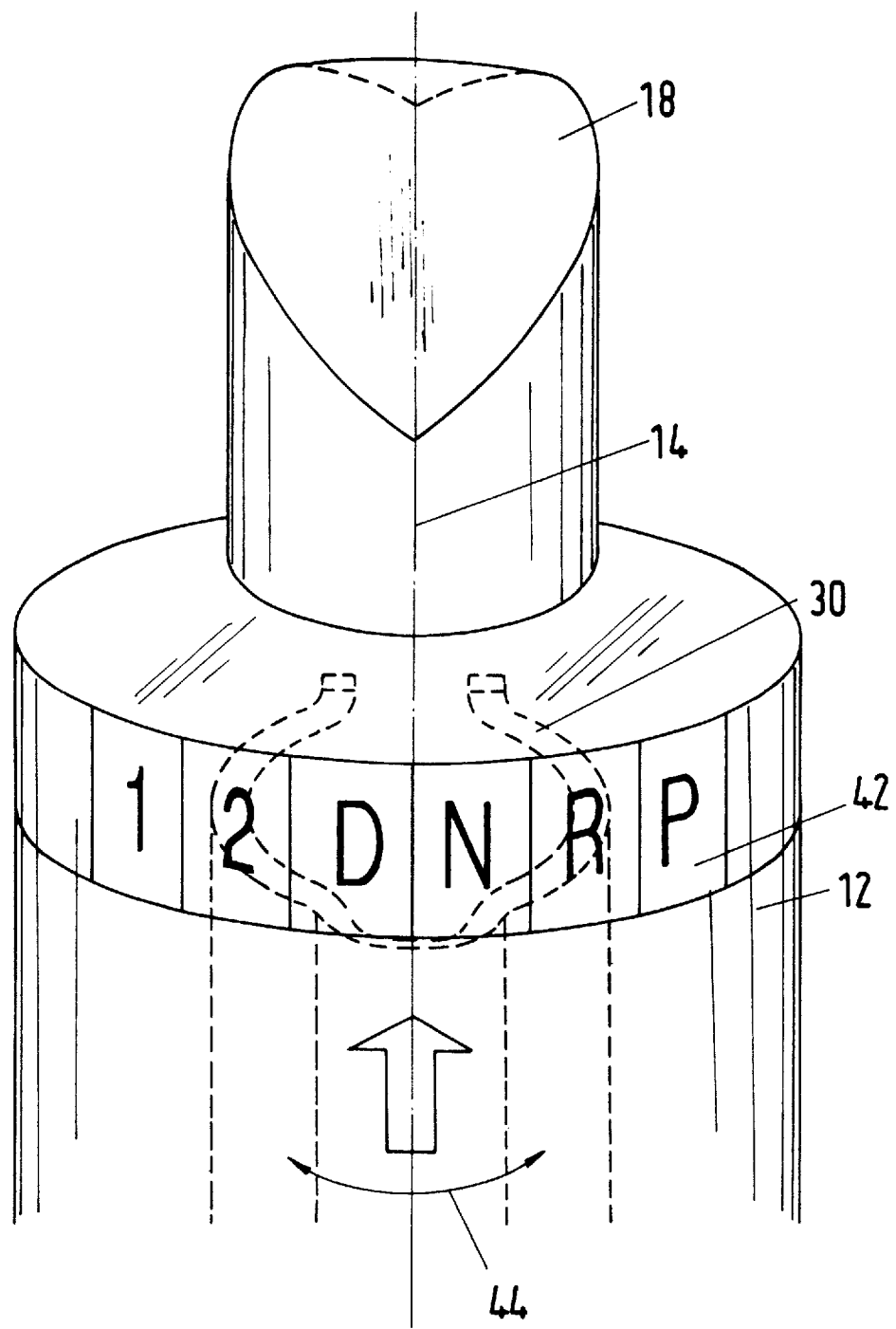
FIG. 3 is an enlarged top view of the embodiment of the invention shown in FIG. 1.

FIG. 3 is a top view showing a further enlargement of a top part of the gear selector according to the invention, illustrating the lighting device 30 which may be integrated in either the lever 10 or the knob 18. A gear display 42 indicates the currently selected gear or driving position. The handle 12 is rotatable in the directions of the arrow 44 for the selection of an appropriate gear or driving position.

Although the invention has been described herein with reference to a specific embodiment, many modifications and variations therein will readily occur to those skilled in the art. Accordingly, all such variations and modifications are included within the intended scope of the invention.

I claim:

1. A hand brake and gear selector for a motor vehicle comprising a lever supported at one end for pivotal motion to actuate a hand brake and a handle on the lever for rotation about the longitudinal axis of the handle for selection of a transmission gear of the vehicle.

2. A hand brake and gear selector according to claim 1 wherein the longitudinal axes of the lever and of the handle are parallel.

3. A hand brake and gear selector according to claim 1 wherein the lever is a hand brake lever comprising an engagement device and an actuating knob for the engagement device, and the handle is rotatable about its longitudinal axis to operate the transmission of the vehicle.

4. A hand brake and gear selector according to claim 1 including a lock to prevent selection of a drive gear of the vehicle.

5. A hand brake and gear selector according to claim 1 including an illuminatable gear or driving-position display arranged at the end of the handle adjacent to an actuating knob for the hand brake.

6. A hand brake and gear selector according to claim 1 wherein the handle is oriented at an angle of from about zero to about 45 degrees with respect to a longitudinal axis of the motor vehicle when the hand brake is disengaged.

\* \* \* \* \*